(12) United States Patent
Kim et al.

(10) Patent No.: US 11,263,166 B2
(45) Date of Patent: Mar. 1, 2022

(54) OIS CIRCUIT, OIS DATA SHARING DEVICE, AND OPERATING METHOD THEREOF

(71) Applicant: Samsung Electro-Mechanics Co., Ltd., Suwon-si (KR)

(72) Inventors: Gyu Won Kim, Suwon-si (KR); Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/015,402

(22) Filed: Sep. 9, 2020

(65) Prior Publication Data

US 2021/0382844 A1    Dec. 9, 2021

(30) Foreign Application Priority Data

Jun. 8, 2020 (KR) .................... 10-2020-0069003

(51) Int. Cl.
| | |
|---|---|
| *G06F 13/42* | (2006.01) |
| *G06F 13/40* | (2006.01) |
| *G06F 11/30* | (2006.01) |
| *G02B 27/64* | (2006.01) |
| *G06F 13/16* | (2006.01) |

(52) U.S. Cl.
CPC ......... *G06F 13/4282* (2013.01); *G02B 27/64* (2013.01); *G06F 11/3089* (2013.01); *G06F 13/1605* (2013.01); *G06F 13/4068* (2013.01)

(58) Field of Classification Search
None
See application file for complete search history.

(56) References Cited

U.S. PATENT DOCUMENTS

| | | | | | |
|---|---|---|---|---|---|
| 10,812,716 | B2 * | 10/2020 | Kim | .................... | H04N 5/23287 |
| 10,827,120 | B1 * | 11/2020 | Kim | .................... | H04N 5/23287 |

(Continued)

FOREIGN PATENT DOCUMENTS

| | | | | | |
|---|---|---|---|---|---|
| CN | 108184100 | A | * | 6/2018 | |
| CN | 108337381 | A | * | 7/2018 | ........... H04N 5/2254 |

(Continued)

OTHER PUBLICATIONS

'Optical Image Stabilization (OIS)' White Paper by Rohm Semiconductor, copyright 2013. (Year: 2013).*

(Continued)

*Primary Examiner* — Steven G Snyder
(74) *Attorney, Agent, or Firm* — NSIP Law (57) ABSTRACT

An optical image stabilization (OIS) circuit includes a first OIS circuit configured to operate as a serial peripheral interface (SPI) bus master with respect to a single sensor, read sensor data from the single sensor, and store the read sensor data, and configured to transmit a control code in a first SPI slave operation mode prior to a second SPI slave operation mode, and provide the sensor data in the second SPI slave operation mode, while operating as an SPI slave; and a second OIS circuit configured to operate as a SPI master with respect to the first OIS circuit, read the control code from the first OIS circuit, and store the control code in a first SPI master operation mode, and further configured to read and store the sensor data in a second SPI master operation mode subsequent to the first SPI master operation mode.

20 Claims, 8 Drawing Sheets

(56) References Cited

U.S. PATENT DOCUMENTS

| | | | |
|---|---|---|---|
| 11,039,071 B2* | 6/2021 | Min | G02B 13/001 |
| 11,050,914 B1* | 6/2021 | Kang | H02K 41/0354 |
| 2008/0152332 A1* | 6/2008 | Koo | H04N 5/23248 |
| | | | 396/55 |
| 2019/0253629 A1* | 8/2019 | Kim | H04N 5/23245 |
| 2020/0120283 A1* | 4/2020 | Min | H04N 5/2258 |
| 2020/0336663 A1* | 10/2020 | Kim | H04N 5/23245 |
| 2021/0096389 A1* | 4/2021 | Kim | G02B 27/646 |
| 2021/0227110 A1* | 7/2021 | Kang | H04N 5/23212 |
| 2021/0227114 A1* | 7/2021 | Min | H04N 5/2254 |
| 2021/0321039 A1* | 10/2021 | Kim | G06F 13/4282 |

FOREIGN PATENT DOCUMENTS

| | | | | |
|---|---|---|---|---|
| CN | 111031235 A | * | 4/2020 | |
| CN | 111371997 A | * | 7/2020 | |
| CN | 111835945 A | * | 10/2020 | H04N 5/23287 |
| CN | 112153278 A | * | 12/2020 | |
| CN | 112188084 A | * | 1/2021 | |
| KR | 10-2009-0128605 A | | 12/2009 | |
| KR | 10-2016-0102980 A | | 8/2016 | |
| WO | WO 2015/069517 A1 | | 5/2015 | |

OTHER PUBLICATIONS

'Optical Image Stabilization (OIS)' by Fabrizio La Rosa et al. (date unknown, precedes May 2018—see Gavali NPL, which cites it). (Year: 2018).*

'Image Stabilisation using Piezoelectric Effect' by Anant Gavali et al., International Journal for Research in Applied Science & Engineering Technology (IJRASET), vol. 6 Issue V, May 2018. (Year: 2018).*

'IDG-2020 & IXZ-2020 Datasheet Revision 1.1' by InvenSense, Sep. 29, 2016. (Year: 2016).*

'LC898124EP2XC Optical Image Stabilization (OIS) / Open-Auto Focus (AF) Controller & Driver integrating an on-chip 32-bit DSP' by ON Semiconductor, Mar. 2017. (Year: 2017).*

Korean Patent Application KR10-2019-0046210 Machine Translation. (Year: 2019).*

* cited by examiner

OIS CIRCUIT, OIS DATA SHARING DEVICE, AND OPERATING METHOD THEREOF

CROSS-REFERENCE TO RELATED APPLICATION(S)

This application claims the benefit under 35 USC § 119(a) of Korean Patent Application No. 10-2020-0069003, filed on Jun. 8, 2020, in the Korean Intellectual Property Office, the entire disclosure of which is incorporated herein by reference for all purposes.

BACKGROUND

1. Field

The following description relates to an optical image stabilization (OIS) circuit and an OIS data sharing device, and an operating method thereof.

2. Description of Related Art

Typically, a camera module may include an OIS circuit, and the OIS circuit may detect hand-shake information and may move a lens or an image sensor in an opposite direction of the hand-shake such that a clear image, unaffected by the hand-shake, may be obtained even when a camera shakes.

A general OIS circuit may use sensor data received from a gyro sensor to achieve the stable operation of a camera module.

The OIS circuit may read sensor data from a gyro sensor by implementing a serial peripheral interface bus (SPI)/inter-integrated circuit (I2C).

Additionally, in a typical OIS circuit, one gyro sensor is configured to be provided in a one-to-one manner with an OIS circuit. Accordingly, when a gyro sensor is necessary, a plurality of driver circuits (driver ICs) may be connected to the plurality of gyro sensors in a one-to-one manner.

In an example, when two OIS circuits applied to two camera modules are used, two gyro sensors may be necessary.

Recently, as electronic devices have become more multifunctional, and the performance of electronic devices have become more enhanced, electronic cameras, such as electronic cameras installed in vehicles or smartphones, may include an increasing number of camera modules.

When a plurality of camera modules are mounted on an electronic device, and a plurality of gyro sensors are used, production costs may increase.

To address the issue described above, a single gyro sensor may be used instead of using a plurality of gyro sensors. However, in this example, some issues related to sharing of sensor data may occur between a plurality of OIS circuits connected to a single gyro sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical image stabilization (OIS) circuit includes a first OIS circuit, configured to operate as a serial peripheral interface (SPI) bus master with respect to a single sensor, read sensor data from the single sensor, and store the read sensor data, and further configured to transmit a control code in a first SPI slave operation mode prior to a second SPI slave operation mode, and transmit the read sensor data in the second SPI slave operation mode, while operating as an SPI slave; and a second OIS circuit, configured to operate as a SPI master with respect to the first OIS circuit, read the control code from the first OIS circuit, and store the read control code in a first SPI master operation mode, and further configured to read and store the sensor data in a second SPI master operation mode subsequent to the first SPI master operation mode.

The first OIS circuit may include a first SPI master, configured to read the sensor data from the single sensor; a first memory, configured to store the read sensor data; a second memory, configured to store the control code; a first SPI slave, configured to transmit the read sensor data based on a request from the second OIS circuit in the second SPI slave operation mode; and a second SPI slave, configured to transmit the control code based on a request from the second OIS circuit in the first SPI slave operation mode.

The second OIS circuit may include a second SPI master, configured to operate as an SPI master with respect to the first SPI slave and the second SPI slave of the first OIS circuit, and read the control code through the second SPI slave in the first SPI master operation mode, and read the sensor data through the first SPI slave in the second SPI master operation mode; and a third memory, configured to store the control code and the sensor data read by the second SPI master.

The second OIS circuit may be configured to automatically identify a communication mode with the first OIS circuit by performing a process of identifying the communication mode with the first OIS circuit before communicating with the first OIS circuit, and determining the communication mode.

The second OIS circuit may be configured to recognize a type of a corresponding memory to be read based on header information stored in a second memory, which is an internal memory of the first OIS circuit, or an external memory, and determine a frame structure appropriate for a type of the recognized memory.

In a general aspect, an optical image stabilization (OIS) device includes a single sensor, configured to operate as a serial peripheral interface (SPI) bus slave, and to transmit sensor data; a first OIS circuit, configured to operate as an SPI master with respect to the single sensor, read sensor data from the single sensor, and store the read sensor data, and further configured to transmit a control code in a first SPI slave operation mode prior to a second SPI slave operation mode, and transmit the read sensor data in the second SPI slave operation mode, while operating as an SPI slave; and a second OIS circuit, configured to operate as an SPI master with respect to the first OIS circuit, read the control code from the first OIS circuit, and store the read control code in a first SPI master operation mode, and further configured to read and store the sensor data in a second SPI master operation mode subsequent to the first SPI master operation mode.

The first OIS circuit may include a first SPI master, configured to read the sensor data from the single sensor; a first memory, configured to store the read sensor data; a second memory, configured to store the control code; a first SPI slave, configured to transmit the sensor data based on a request from the second OIS circuit in the second SPI slave operation mode; and a second SPI slave, configured to transmit the control code based on a request from the second OIS circuit in the first SPI slave operation mode.

The first OIS circuit may include a first SPI master configured to read the sensor data from the single sensor; a first memory, configured to store the read sensor data; and a first SPI slave, configured to transmit the read sensor data based on a request from the second OIS circuit in the second SPI slave operation mode, wherein the OIS device further comprises an external memory device, configured to transmit the control code based on a request from the second OIS circuit, and wherein the external memory device comprises: a third memory configured to store the control code; and a third SPI slave configured to transmit the control code based on a request from the second OIS circuit in the second SPI slave operation mode.

The second OIS circuit may include a second SPI master, configured to operate as an SPI master with respect to the first SPI slave and the second SPI slave of the first OIS circuit, and read the control code through the second SPI slave in the first SPI master operation mode and to read the sensor data through the first SPI slave in the second SPI master operation mode; and a third memory, configured to store the control code and the sensor data read by the second SPI master.

The second OIS circuit may be configured to identify a communication mode with the first OIS circuit by performing a process of identifying the communication mode with the first OIS circuit before communicating with the first OIS circuit, and determining the communication mode.

The second OIS circuit may be configured to recognize a type of a corresponding memory to be read based on header information stored in a second memory of the first OIS circuit or a third memory of the external memory device, and determining a frame structure appropriate for a type of the recognized memory.

The OIS device may include a PIN multiplexer, configured to select one of the first SPI slave and the second SPI slave in response to a chip selection signal of the second OIS circuit.

In a general aspect, an operating method includes determining, by a second optical image stabilization (OIS) circuit, a communication mode by automatically recognizing a communication mode with a first OIS circuit; determining, by a second OIS circuit, a frame structure based on a type of a memory that stores a control code, where the second OIS circuit is configured to operate as a serial peripheral interface (SPI) master with respect to the first OIS circuit while the second OIS circuit performs the determined communication mode; reading a control code stored in the memory using the frame structure in a first SPI master operation mode; and changing a mode from the first SPI master operation mode to a second SPI master operation mode in the second OIS circuit, and reading, by the second OIS circuit, sensor data from the first OIS circuit.

The determining the communication mode may include determining a communication mode by automatically identifying a communication mode with the first OIS circuit by performing a process of identifying a communication mode with the first OIS circuit before communication with the first OIS circuit is performed.

The reading the control code may include operating the second OIS circuit as a SPI master with respect to the first OIS circuit in the first SPI master operation mode, selecting the second SPI slave of the first OIS circuit in the first SPI master operation mode, and reading, by the second OIS circuit, the control code from the memory and storing the control code.

The determining the frame structure may include recognizing, by the second OIS circuit, a type of a corresponding memory to be read based on head information stored in a memory of the first OIS circuit, and determining, by the second OIS circuit, a frame structure appropriate for a type of the corresponding memory.

The reading the sensor data may include selecting the first SPI slave included in the first OIS circuit, reading the sensor data through the first SPI slave, and storing the sensor data by the second OIS circuit in the second SPI master operation mode.

In a general aspect, an electronic device includes an optical image stabilization (OIS) device including: a sensor; a first OIS circuit; and a second OIS circuit; wherein the first OIS circuit comprises a serial peripheral interface (SPI) master, configured to read sensor data from the sensor; a first SPI slave, configured to transmit the sensor data to the second OIS circuit in a first SPI slave operation mode; and a second SPI slave, configured to transmit a control code to the second OIS circuit in a second SPI slave operation mode; and wherein the second OIS circuit is configured to operate as an SPI master with respect to the first SPI slave and the second SPI slave.

The device may further include a PIN multiplexer, configured to select one of the first SPI slave and the second SPI slave based on a specific code value transmitted by the second OIS circuit.

The first OIS circuit and the second OIS circuit may be connected in one of a 4-wire communication mode and a 3-wire communication mode.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the drawings, the same elements having the same function in the overall descriptions will be described with the use of the same reference numeral.

Figure 1:
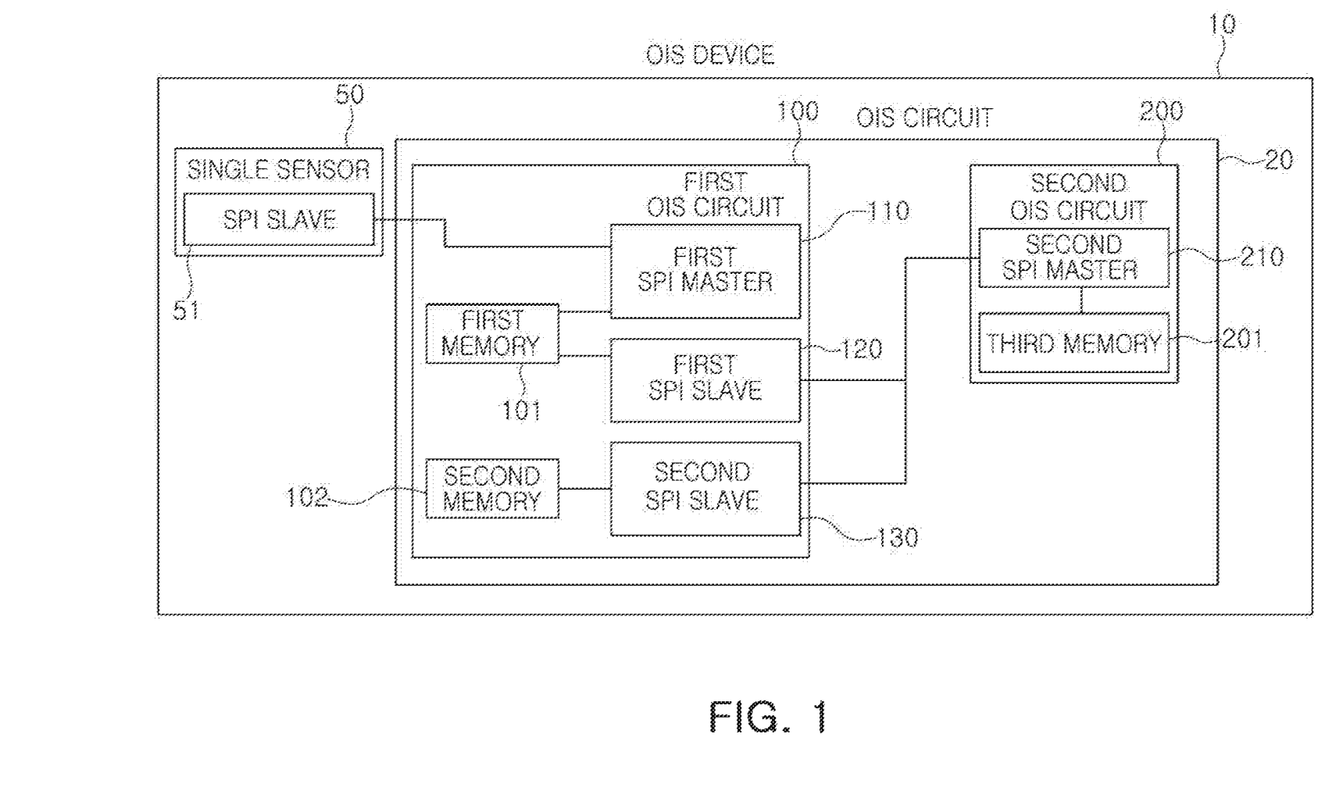
FIG. 1 is a block diagram illustrating an example OIS device, in accordance with one or more embodiments.

FIG. 1 is a block diagram illustrating an example OIS device, in accordance with one or more embodiments.

Referring to FIG. 1, the OIS device 10 in the example may include a single sensor 50, a first OIS circuit 100, and a second OIS circuit 200.

The single sensor 50, including a Serial Peripheral Interface (SPI) slave 51, may operate as an SPI slave with respect to the first OIS circuit 100, may respond to a request of the first OIS circuit 100 which may operate as an SPI master, and may transmit sensor data (SD) to the first OIS circuit 100.

The first OIS circuit 100 may operate as an SPI master with respect to the single sensor 50, may read and store sensor data (SD) from the single sensor 50, may operate as a SPI slave with respect to the second OIS circuit 200, and may transmit the sensor data (SD) and a control code (SC) to the second OIS circuit 200. In an example, the control code may correspond to a driving-use firmware code.

The second OIS circuit 200 may operate as an SPI master with respect to the first OIS circuit 100, may read the control code (SC) from the first OIS circuit 100, and may store the control code, and may read and store the sensor data (SD).

In an example, the control code (SC) may determine a frame structure according to a type of a memory such as an internal memory or an external memory of the first OIS circuit 100, and may read the control code using the frame structure appropriate for the corresponding memory. This configuration will be described in greater detail later.

Figure 2:
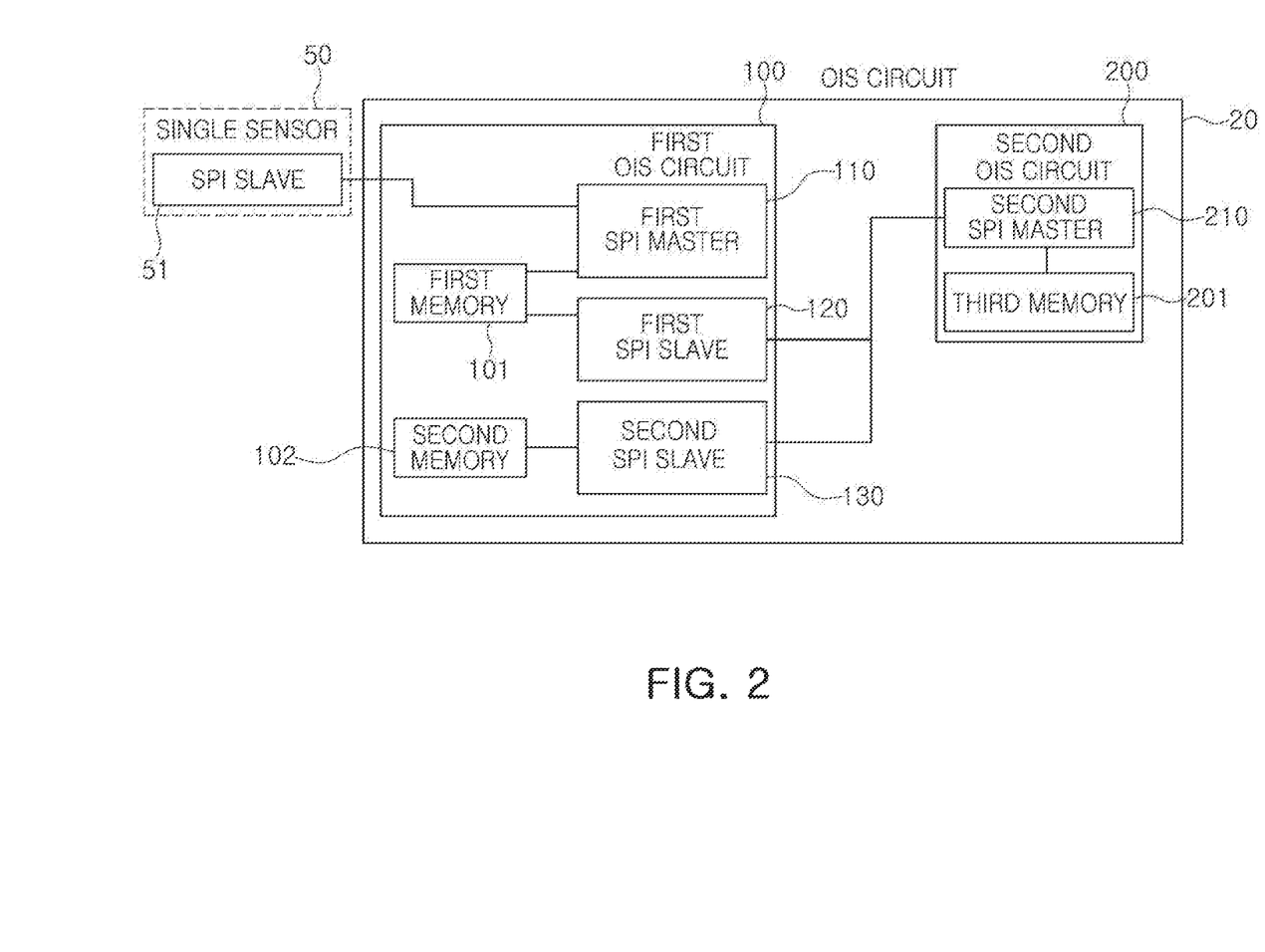
FIG. 2 is a block diagram illustrating an example OIS circuit, in accordance with one or more embodiments.

FIG. 2 is a block diagram illustrating an example OIS circuit, in accordance with one or more embodiments.

Referring to FIG. 2, an OIS circuit 20 in the example embodiment may include a first OIS circuit 100, and a second OIS circuit 200.

The first OIS circuit 100 may operate as an SPI master with respect to a single sensor 50, and may read sensor data (SD) received from a single sensor 50, and may store the sensor data. The first OIS circuit may also operate as an SPI slave with respect to the second OIS circuit 200, the first OIS circuit 100 may provide a control code in a second SPI slave operation mode prior to the first SPI slave operation mode, and in the first SPI slave operation mode, the first OIS circuit 100 may provide the sensor data.

The second OIS circuit 200 may operate as an SPI master with respect to the first OIS circuit 100 and may read the control code (SC) from the first OIS circuit 100 and may store the control code in the first SPI master operation mode, and the second OIS circuit 200 may read and store the sensor data (SD) in the second SPI master operation mode subsequent to the first SPI master operation mode.

Referring to FIGS. 1 and 2, the first OIS circuit 100 may include a first SPI master 110, a first memory 101, a first SPI slave 120, a second memory 102, and a second SPI slave 130.

The first SPI master 110 may operate as an SPI master with respect to the single sensor 50, and may read the sensor data (SD) from the single sensor 50.

The first memory 101 may store sensor data (SD) read by the first SPI master 110.

The second memory 102 may store the control code (SC). In an example, the second memory 102 may include header information (head information or control value), and the header information may include a specific ID that identifies a type of a memory.

The first SPI slave 120 may operate as an SPI slave with respect to the second OIS circuit 200, and may transmit the received sensor data (SD) to the second OIS circuit 200 based on a request from the second OIS circuit 200 in the second SPI slave operation mode.

The second SPI slave 130 may transmit the control code (SC) according to a request of the second OIS circuit 200 in the first SPI slave operation mode.

The second OIS circuit 200 may include a second SPI master 210 and a third memory 201.

The second SPI master 210 may operate as an SPI master with respect to the first SPI slave 120 and the second SPI slave 130 of the first OIS circuit 100, and may select the second SPI slave 130 and may read the control code (SC) in the first SPI master operation mode, and in the second SPI master operation mode, the second SPI master 210 may select the first SPI slave 120 and may read the sensor data SD.

The third memory 201 may store the control code (SC) and the sensor data (SD) read by the second SPI master 210.

Figure 3:
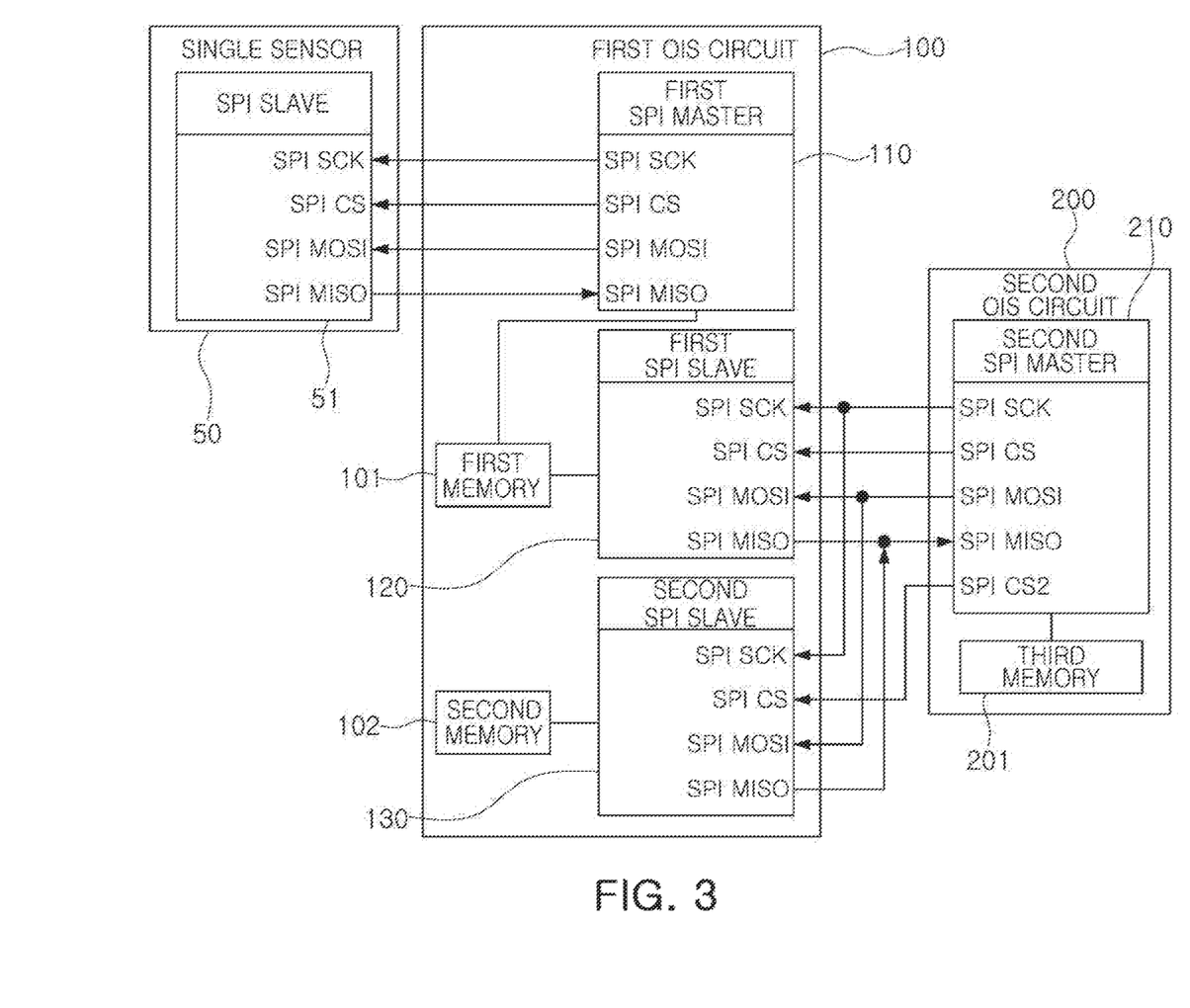
FIG. 3 is a diagram illustrating an example interfacing among a single sensor, a first OIS circuit, and a second OIS circuit illustrated in FIG. 1.

FIG. 3 illustrates an example of interfacing among a single sensor, a first OIS circuit, and a second OIS circuit illustrated in FIG. 1.

Referring to FIG. 3, the second memory 102 may be configured to store the control code (SC), and may be implemented as an internal memory of the first OIS circuit 100.

The second SPI slave 130 may transmit the control code SC stored in the second memory 102 to the second OIS circuit 200 according to the request of the second OIS circuit 200.

In FIG. 3, the SPI slave 51 of the single sensor 50 and the first SPI master 110 of the first OIS circuit 100 may be connected to each other through SPI clock signal (SPI SCK), SPI chip select signal (SPI CS), SPI mater out slave in (SPI MOSI), and SPI master in slave out (SPI MISO). Additionally, the first SPI slave 120 of the first OIS circuit 100 and the second SPI master 210 of the second OIS circuit 200 may be connected to each other through SPI SCK, SPI CS, SPI MOSI, and SPI MISO. Additionally, the second SPI slave 130 of the first OIS circuit 100 and the second SPI master 210 of the second OIS circuit 200 may be connected to each other through SPI SCK, SPI MOSI, SPI MISO, and SPI CS2.

Figure 4:
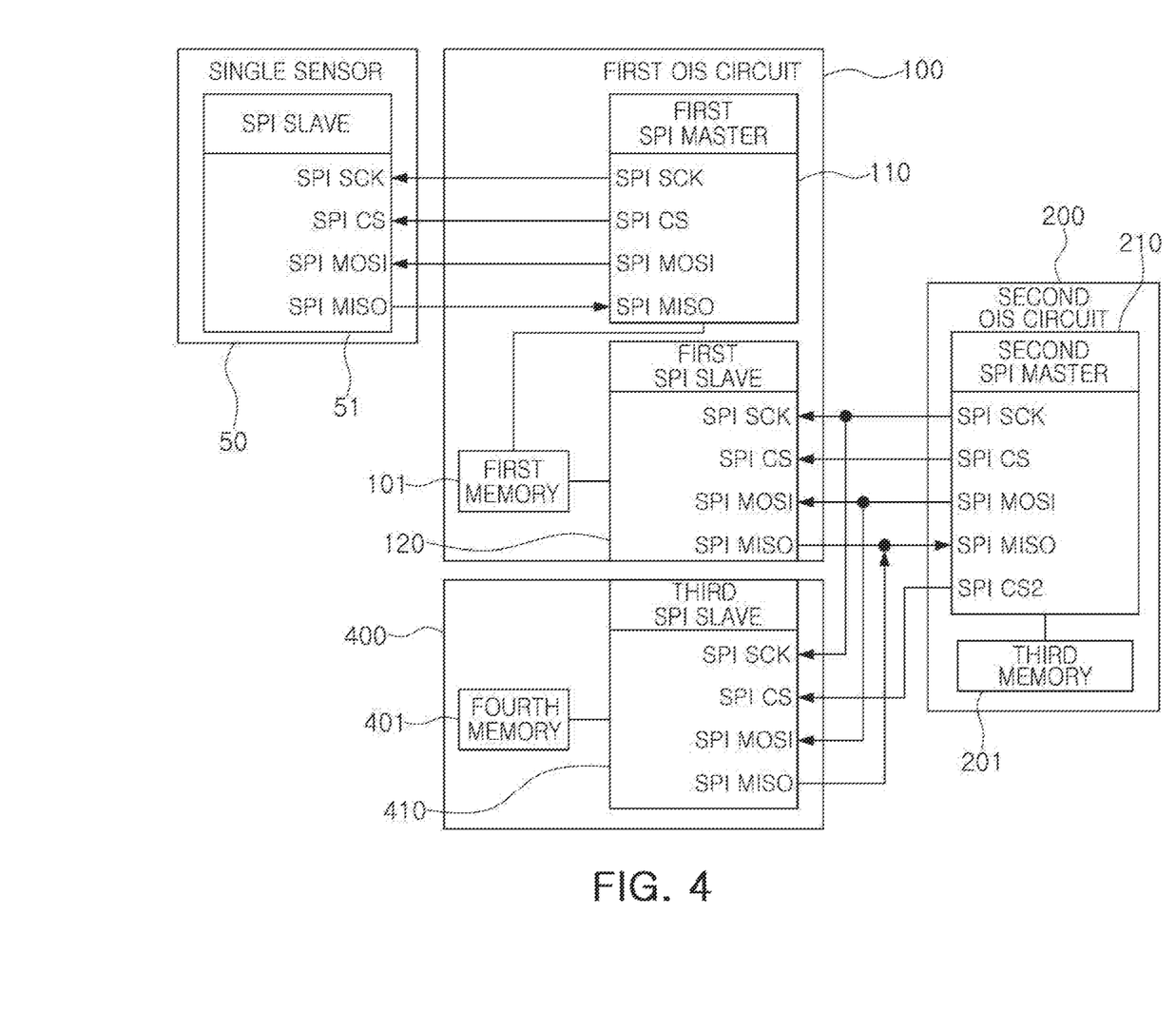
FIG. 4 is a diagram illustrating an example of interfacing among a single sensor, a first OIS circuit, and a second OIS circuit illustrated in FIG. 1.

FIG. 4 illustrates an example of interfacing among a single sensor, a first OIS circuit, and a second OIS circuit illustrated in FIG. 1.

Referring to FIG. 4, the first OIS circuit 100 may include a first SPI master 110, a first memory 101, and a first SPI slave 120.

The first SPI master 110 may read the sensor data (SD) from a single sensor 50.

The first memory 101 may store the sensor data (SD).

The first SPI slave 120 may transmit the sensor data (SD) based on a request from the second OIS circuit 200.

Additionally, the OIS device may further include an external memory device 400. The external memory device 400 may transmit the control code (SC) based on a request from the second OIS circuit 200.

In an example, the external memory device 400 may include a fourth memory 401 and a third SPI slave 410.

The fourth memory 401 may store the control code (SC).

The third SPI slave 410 may transmit the control code (SC) based on a request from the second OIS circuit 200.

In FIG. 4, the SPI slave 51 of the single sensor 50 and the first SPI master 110 of the first OIS circuit 100 may be connected to each other through SPI SCK, SPI CS, SPI MOSI, and SPI MISO. Additionally, the first SPI slave 120 of the first OIS circuit 100 and the second SPI master 210 of the second OIS circuit 200 may be connected to each other through SPI SCK, SPI CS, SPI MOSI, and SPI MISO. Additionally, the third SPI slave 410 of the external memory device 400 and the second SPI master 210 of the second OIS circuit 200 may be connected to each other through SPI SCK, SPI MOSI, SPI MISO, and SPI CS2.

Figure 5:
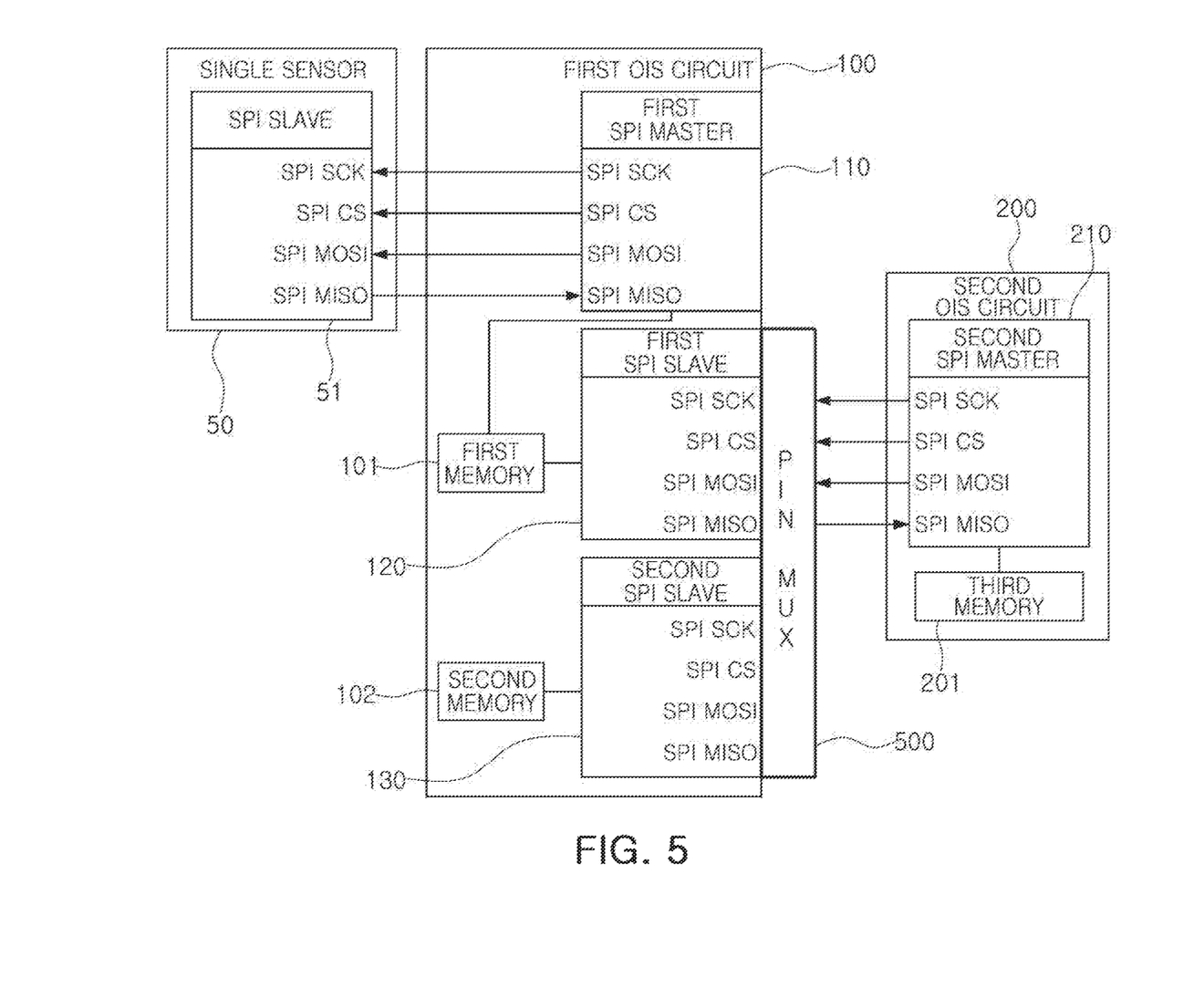
FIG. 5 is a diagram illustrating an example of interfacing among a single sensor, a first OIS circuit, and a second OIS circuit illustrated in FIG. 1.

FIG. 5 illustrates an example of interfacing among a single sensor, a first OIS circuit, and a second OIS circuit illustrated in FIG. 1.

Referring to FIG. 5, the OIS device 10 may further include a PIN multiplexer 500.

The PIN multiplexer 500 may be synchronized with a change of an operation mode of the second OIS circuit 200, and may select one of the first SPI slave 120 and the second SPI slave 130. In an example, when the second OIS circuit 200 sends a specific code value to the first OIS circuit 100 while changing from an operation mode to read a control code to an operation mode to read sensor data, the first OIS circuit 100 may be changed from the second SPI slave 130 to read the control code (SC) to the first SPI slave 120 to read sensor data through the PIN multiplexer 500 according to the specific code value.

In FIG. 5, the SPI slave 51 of the single sensor 50 and the first SPI master 110 of the first OIS circuit 100 may be connected to each other through SPI SCK, SPI CS, SPI MOSI, and SPI MISO.

Additionally, the PIN multiplexer (PIN Multiplexer) 500 and the second SPI master 210 of the second OIS circuit 200 may be connected to each other through SPI SCK, SPI CS, SPI MOSI, and SPI MISO. The PIN multiplexer 500 and the first SPI slave 120 of the first OIS circuit 100 may be connected to each other through SPI SCK, SPI CS, SPI MOSI, and SPI MISO. Further, the PIN multiplexer 500 and the second SPI slave 130 of the first OIS circuit 100 may be connected to each other through SPI SCK, SPI MOSI, SPI MISO, and SPI CS2.

The first OIS circuit 100 and the second OIS circuit 200 may be connected in a 4-wire (4wire) communication mode or a 3-wire (3wire) communication mode, and a 4-wire (4wire) communication mode will be described with reference to FIG. 6.

Figure 6:
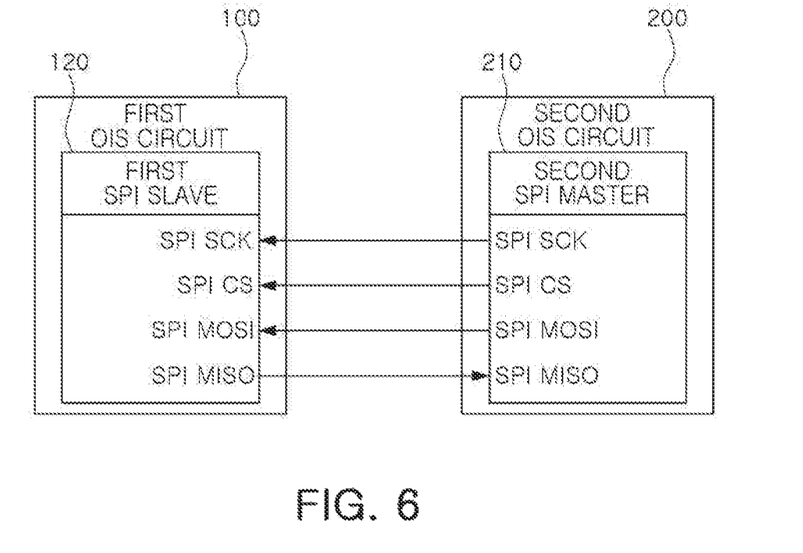
FIG. 6 is a diagram illustrating an example communication mode between a first OIS circuit and a second OIS circuit, in accordance with one or more embodiments.

FIG. 6 illustrates an example communication mode between a first OIS circuit and a second OIS circuit, in accordance with one or more embodiments.

Referring to FIG. 6, the first SPI slave 120 of the first OIS circuit 100 and the second SPI master 210 of the second OIS circuit 200 may be connected in a 4-wire (4wire) communication mode through SPI clock signal (SPI SCK), SPI chip select signal (SPI CS), SPI mater out slave in (SPI MOSI), and SPI master in slave out (SPI MISO).

Alternatively, the first SPI slave 120 of the first OIS circuit 100 and the second SPI master 210 of the second OIS circuit 200 may be connected in a 3-wire (3wire) communication mode through SPI SCK, SPI CS and SPI master in master out (SPI MIMO).

Figure 7:
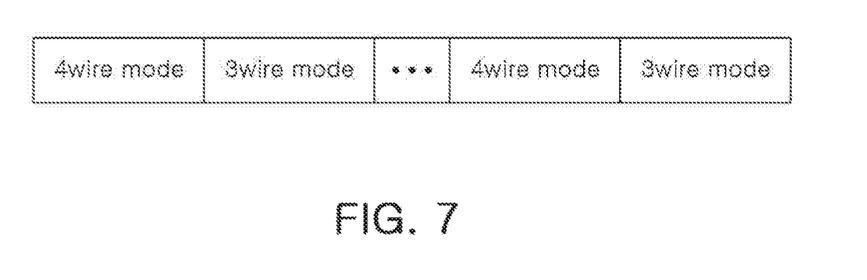
FIG. 7 is a diagram illustrating an example process of periodically checking a communication mode between a first OIS circuit and a second OIS circuit, in accordance with one or more embodiments.

FIG. 7 illustrates an example process of periodically checking a communication mode between a first OIS circuit and a second OIS circuit.

In an example, as illustrated in FIG. 7, a signal may be transmitted in a 4-wire (4wire) communication mode based on repetitive signal transmission, and a response of a 4-wire (4wire) communication mode and a 3-wire (3wire) communication mode, and when there is a response to the transmission of the signal, the response may be confirmed in a 4-wire communication mode. When there is no response, a signal may be transmitted in a 3-wire communication mode, and when there is a response to the transmission of the signal, the response may be configured in a 3-wire communication mode.

In this process, when there is no response, the process may be repeated until there is a response.

Through the process described above, the second OIS circuit 200 may perform a process of identifying a communication mode with the first OIS circuit as described above before communicating with the first OIS circuit 100, and the second OIS circuit 200 may automatically check a communication wire (4wire or 3wire) with the first OIS circuit 100 and may determine a communication mode.

In an example, the second OIS circuit 200 may import header information from an internal memory (a second memory 102) or an external memory of the first OIS circuit 100. In this example, the header information may have a specific ID. For example, when it is assumed that a hex value is 550F, the second OIS circuit 200 may continue to change a communication mode and may execute the communication mode until a corresponding value comes in.

When the corresponding value is read in the 3wire or 4wire communication mode, the communication mode may be fixed as an SPI communication mode, and all header information may be read. After reading all the information, the second OIS circuit 200 may read the control code (SC) to drive the second OIS circuit 200, from the second memory 102 or the external memory (the fourth memory 401 in FIG. 4) of the first OIS circuit 100, and may store the control code in an SRAM, while operating as an SPI master with respect to the first OIS circuit 100.

As described above, after the reading, the second OIS circuit 200 may change from the first SPI master operation mode to the second SPI master operation mode to read sensor data, and the first OIS circuit 100 may select the second SPI slave to share sensor data and may share the data.

Figure 8:
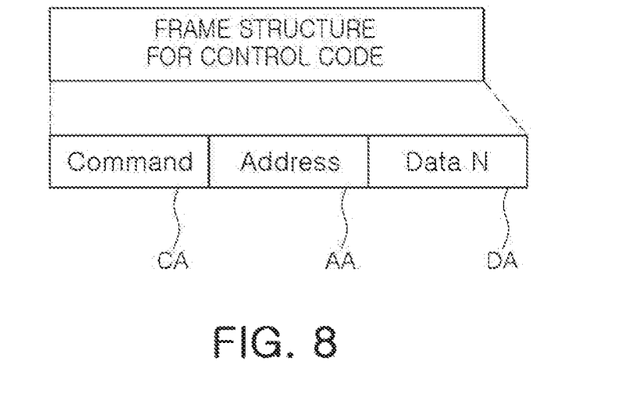
FIG. 8 illustrates an example frame structure for reading a control code, in accordance with one or more embodiments.

FIG. 8 illustrates an example frame structure used to read a control code.

Referring to FIG. 8, the frame structure to read a control code, may include a command area (CA), an address area (AA), and a data area (DA). In an example, the command area (CA) may refer to a control code, the address area (AA) may refer to an address position, and the data area (DA) may refer to a control value.

Figure 9:
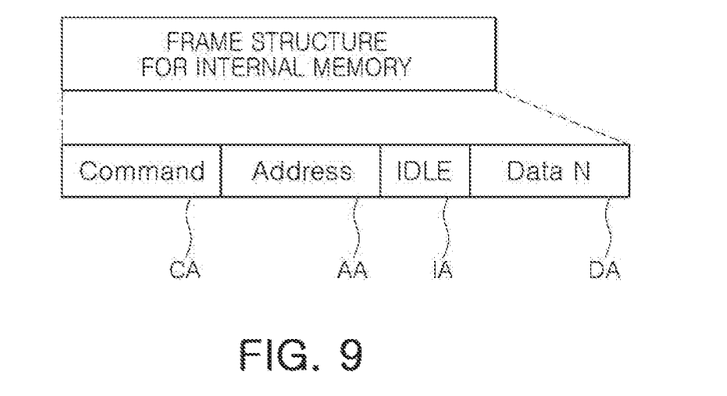
FIG. 9 illustrates an example frame structure of an internal memory for reading, in accordance with one or more embodiments.
Figure 10:
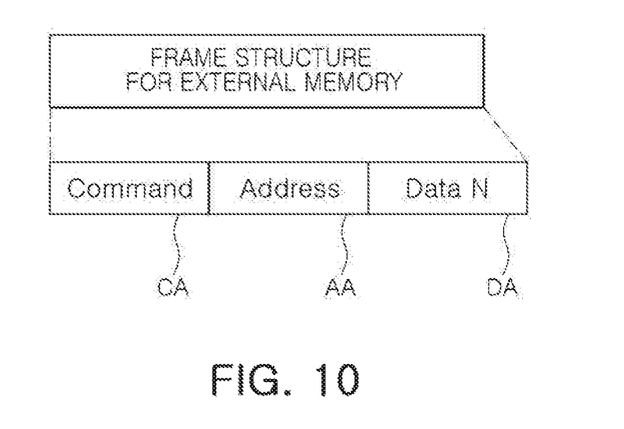
FIG. 10 illustrates an example frame structure of an external memory for reading, in accordance with one or more embodiments.

FIG. 9 illustrates an example frame structure of an internal memory to be read. FIG. 10 illustrates an example frame structure of an external memory to be read.

The second OIS circuit 200 may recognize a type of a target memory to be read based on header information stored in the control code SC, and may determine a frame structure suitable for the recognized type of memory.

In an example, the frame structure of the internal memory to be read is illustrated in FIG. 9, and the frame structure of the external memory to be read is illustrated in FIG. 10.

Referring to FIG. 9, a frame structure of the internal memory to be read may include a command area (CA), an address area (AA), and a data area (DA).

Referring to FIG. 10, a frame structure for reading an external memory may include a comment area (CA), an address area (AA), an idle area (IA), and a data area (DA).

The idle area (IA) is the time necessary to import data from the memory.

Figure 11:
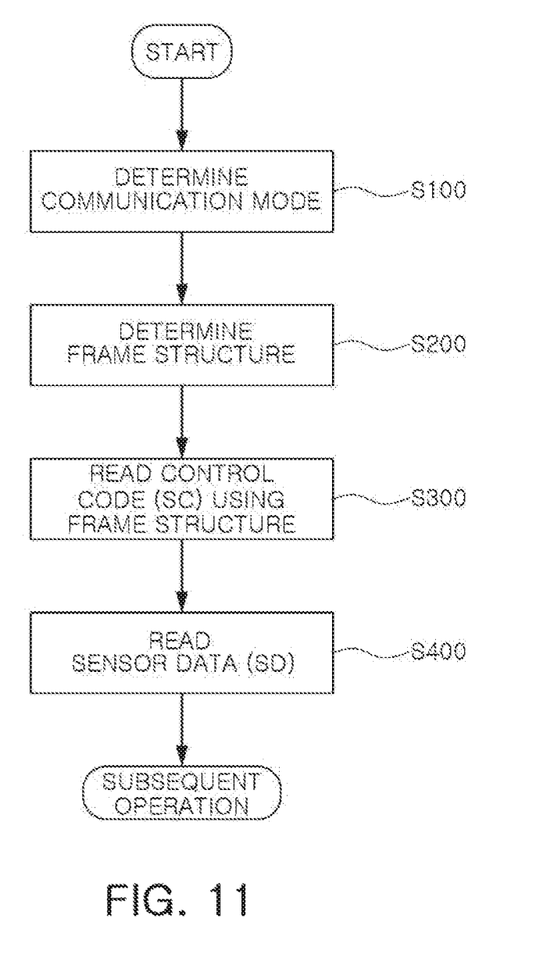
FIG. 11 is a flowchart illustrating an operating method of an OIS device, in accordance with one or more embodiments.

FIG. 11 is a flowchart illustrating an operating method of an OIS device, in accordance with one or more embodiments. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

An operating method of the OIS device in the example embodiment will be described with reference to FIGS. 1 to 11. In the description of the operating method of the OIS device in the example embodiment, the same description of the operations described with reference to FIGS. 1 to 10 may be applied, and accordingly, overlapping description will not be repeated in the description of the operating method of the OIS device.

Referring to FIGS. 2 and 11, the operating method of the OIS device may be applied to an OIS device including a single sensor 50, a first OIS circuit 100, and a second OIS circuit 200.

Referring to FIG. 11, in operation S100, the second OIS circuit 200 may automatically identify a communication mode associated with the first OIS circuit 100, and may determine the communication mode.

In an example, in operation S100, a communication wire (4wire or 3wire) associated with the first OIS circuit 100 may be automatically checked before communication with the first OIS circuit 100 is performed, and a communication mode may be determined.

Thereafter, in operation S200, when the determined communication mode is performed, the second OIS circuit 200 may operate as an SPI master with respect to the first OIS circuit 100, and may determine a frame structure based on a type of a memory (the second memory 102 in FIG. 1 or the fourth memory 401 in FIG. 4) which has stored a control code (SC).

In an example, in operation S200, the second OIS circuit 200 may recognize a type of a target memory to be read based on header information stored in the second memory 102 in FIG. 1, or the fourth memory 401 in FIG. 4, and may determine a frame structure appropriate for a type of the recognized memory (the second memory 102 in FIG. 1 or the fourth memory 401 in FIG. 4).

Thereafter, in operation S300, the second OIS circuit 200 may read the control code stored in the memory using the frame structure in the first SPI master operation mode.

In an example, in operation S300, the second OIS circuit 200 may operate as an SPI master with respect to the first OIS circuit 100 in the first SPI master operation mode, and may select the second SPI slave of the first OIS circuit 100 in the first SPI master operation mode and may read the control code (SC) from an internal memory or an external memory through the first OIS circuit 100 and may store the control code.

In an example, the second OIS circuit 200 may read the control code (SC) stored in the second memory 102 from the first OIS circuit 100, and may store the control code in the third memory 201, and may transfer a specific value to the first OIS circuit 100.

In this example, the first OIS circuit 100 may change a channel of an SPI slave based on the specific value. In other words, the second OIS circuit 200 may change from the first SPI master operation mode to read the control code, to the second SPI master operation mode to receive sensor data. By changing the operation mode as above, the second OIS circuit 200 may import a control code from an internal memory or an external memory of the first OIS circuit 100, and may also share and use sensor data.

In operation S400, the second OIS circuit 200 may change from the first SPI master operation mode to the second SPI master operation mode, and may read the sensor data SD from the first OIS circuit 100.

In an example, in operation S400, the second OIS circuit 200 may select the first SPI slave included in the first OIS circuit 100 in the second SPI master operation mode, and may read the sensor data (SD) through the first SPI slave, and may store the sensor data.

According to the aforementioned example embodiments, by allowing the sharing of data such as a control code and sensor data among the OIS circuits, the circuits may have a reduced size.

Additionally, by automatically identifying and determining a communication mode (3wire and 4wire) among OIS circuits that share data, operational efficiency may improve.

Additionally, a size of a chip may also be reduced through the sharing of data such that a space occupied by a camera module may be reduced.

Further, it may be possible to correspond to an internal memory or an external memory of a main OIS circuit (the first OIS circuit) which may store a control code.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilization (OIS) circuit, comprising:
   a first OIS circuit, configured to operate as a serial peripheral interface (SPI) bus master with respect to a single sensor, read sensor data from the single sensor, and store the read sensor data, and further configured to transmit a control code in a first SPI slave operation mode prior to a second SPI slave operation mode, and transmit the read sensor data in the second SPI slave operation mode, while operating as an SPI slave; and
   a second OIS circuit, configured to operate as a SPI master with respect to the first OIS circuit, read the control code from the first OIS circuit, and store the read control code in a first SPI master operation mode, and further configured to read and store the sensor data in a second SPI master operation mode subsequent to the first SPI master operation mode.

2. The OIS circuit of claim 1, wherein the first OIS circuit comprises:
   a first SPI master, configured to read the sensor data from the single sensor;
   a first memory, configured to store the read sensor data;
   a second memory, configured to store the control code;
   a first SPI slave, configured to transmit the read sensor data based on a request from the second OIS circuit in the second SPI slave operation mode; and
   a second SPI slave, configured to transmit the control code based on a request from the second OIS circuit in the first SPI slave operation mode.

3. The OIS circuit of claim 2, wherein the second OIS circuit comprises:
   a second SPI master, configured to operate as an SPI master with respect to the first SPI slave and the second SPI slave of the first OIS circuit, and read the control code through the second SPI slave in the first SPI master operation mode, and read the sensor data through the first SPI slave in the second SPI master operation mode; and
   a third memory, configured to store the control code and the sensor data read by the second SPI master.

4. The OIS circuit of claim 3, wherein the second OIS circuit is configured to automatically identify a communication mode with the first OIS circuit by performing a process of identifying the communication mode with the first OIS circuit before communicating with the first OIS circuit, and determining the communication mode.

5. The OIS circuit of claim 3, wherein the second OIS circuit is configured to recognize a type of a corresponding memory to be read based on header information stored in a second memory, which is an internal memory of the first OIS circuit, or an external memory, and determine a frame structure appropriate for a type of the recognized memory.

6. An optical image stabilization (OIS) device, comprising:
   a single sensor, configured to operate as a serial peripheral interface (SPI) bus slave, and to transmit sensor data;
   a first OIS circuit, configured to operate as an SPI master with respect to the single sensor, read sensor data from the single sensor, and store the read sensor data, and further configured to transmit a control code in a first SPI slave operation mode prior to a second SPI slave operation mode, and transmit the read sensor data in the second SPI slave operation mode, while operating as an SPI slave; and
   a second OIS circuit, configured to operate as an SPI master with respect to the first OIS circuit, read the control code from the first OIS circuit, and store the read control code in a first SPI master operation mode, and further configured to read and store the sensor data in a second SPI master operation mode subsequent to the first SPI master operation mode.

7. The OIS device of claim 6, wherein the first OIS circuit comprises:
a first SPI master, configured to read the sensor data from the single sensor;
a first memory, configured to store the read sensor data;
a second memory, configured to store the control code;
a first SPI slave, configured to transmit the sensor data based on a request from the second OIS circuit in the second SPI slave operation mode; and
a second SPI slave, configured to transmit the control code based on a request from the second OIS circuit in the first SPI slave operation mode.

8. The OIS device of claim 6, wherein the first OIS circuit comprises:
a first SPI master configured to read the sensor data from the single sensor;
a first memory, configured to store the read sensor data; and
a first SPI slave, configured to transmit the read sensor data based on a request from the second OIS circuit in the second SPI slave operation mode,
wherein the OIS device further comprises an external memory device, configured to transmit the control code based on a request from the second OIS circuit, and
wherein the external memory device comprises:
a third memory configured to store the control code; and
a third SPI slave configured to transmit the control code based on a request from the second OIS circuit in the second SPI slave operation mode.

9. The OIS device of claim 8, wherein the second OIS circuit comprises:
a second SPI master, configured to operate as an SPI master with respect to the first SPI slave and the second SPI slave of the first OIS circuit, and read the control code through the second SPI slave in the first SPI master operation mode and to read the sensor data through the first SPI slave in the second SPI master operation mode; and
a third memory, configured to store the control code and the sensor data read by the second SPI master.

10. The OIS device of claim 9, wherein the second OIS circuit is configured to identify a communication mode with the first OIS circuit by performing a process of identifying the communication mode with the first OIS circuit before communicating with the first OIS circuit, and determining the communication mode.

11. The OIS device of claim 9, wherein the second OIS circuit is configured to recognize a type of a corresponding memory to be read based on header information stored in a second memory of the first OIS circuit or a third memory of the external memory device, and determining a frame structure appropriate for a type of the recognized memory.

12. The OIS device of claim 9, further comprising:
a PIN multiplexer, configured to select one of the first SPI slave and the second SPI slave in response to a chip selection signal of the second OIS circuit.

13. An operating method comprising:
determining, by a second optical image stabilization (OIS) circuit, a communication mode by automatically recognizing a communication mode with a first OIS circuit;
determining, by the second OIS circuit, a frame structure based on a type of a memory that stores a control code,
where the second OIS circuit is configured to operate as a serial peripheral interface (SPI) master with respect to the first OIS circuit while the second OIS circuit performs the determined communication mode;
reading a control code stored in the memory using the frame structure in a first SPI master operation mode; and
changing a mode from the first SPI master operation mode to a second SPI master operation mode in the second OIS circuit, and reading, by the second OIS circuit, sensor data from the first OIS circuit.

14. The method of claim 13, wherein the determining the communication mode comprises determining a communication mode by automatically identifying a communication mode with the first OIS circuit by performing a process of identifying a communication mode with the first OIS circuit before communication with the first OIS circuit is performed.

15. The method of claim 14, wherein the reading the control code comprises operating the second OIS circuit as a SPI master with respect to the first OIS circuit in the first SPI master operation mode, selecting a second SPI slave of the first OIS circuit in the first SPI master operation mode, and reading, by the second OIS circuit, the control code from the memory and storing the control code.

16. The method of claim 14, wherein the determining the frame structure comprises recognizing, by the second OIS circuit, a type of a corresponding memory to be read based on header information stored in a memory of the first OIS circuit, and determining, by the second OIS circuit, a frame structure appropriate for a type of the corresponding memory.

17. The method of claim 14, wherein the reading the sensor data comprises selecting a first SPI slave included in the first OIS circuit, reading the sensor data through the first SPI slave, and storing the sensor data by the second OIS circuit in the second SPI master operation mode.

18. An electronic device, comprising:
an optical image stabilization (OIS) device comprising:
a sensor;
a first OIS circuit; and
a second OIS circuit;
wherein the first OIS circuit comprises a serial peripheral interface (SPI) master, configured to read sensor data from the sensor; a first SPI slave, configured to transmit the sensor data to the second OIS circuit in a first SPI slave operation mode; and a second SPI slave, configured to transmit a control code to the second OIS circuit in a second SPI slave operation mode; and
wherein the second OIS circuit is configured to operate as an SPI master with respect to the first SPI slave and the second SPI slave.

19. The device of claim 18, further comprising a PIN multiplexer, configured to select one of the first SPI slave and the second SPI slave based on a specific code value transmitted by the second OIS circuit.

20. The device of claim 18, wherein the first OIS circuit and the second OIS circuit are connected in one of a 4-wire communication mode and a 3-wire communication mode.

* * * * *